(12) United States Patent
Hjort

(10) Patent No.: US 7,432,615 B2
(45) Date of Patent: Oct. 7, 2008

(54) UNINTERRUPTABLE POWER SUPPLY SYSTEM AND METHOD

(75) Inventor: Thomas Enné Hjort, Vejle (DK)

(73) Assignee: American Power Conversion Corporation, West Kingston, RI (US)

( * ) Notice: Subject to any disclaimer, the term of this patent is extended or adjusted under 35 U.S.C. 154(b) by 448 days.

(21) Appl. No.: 10/767,450

(22) Filed: Jan. 29, 2004

(65) Prior Publication Data

US 2005/0168073 A1   Aug. 4, 2005

(51) Int. Cl.
    *H02J 9/00* (2006.01)
(52) U.S. Cl. ........................................ 307/64
(58) Field of Classification Search .................. 307/64, 307/62, 65
    See application file for complete search history.

(56) References Cited

U.S. PATENT DOCUMENTS

| | | | |
|---|---|---|---|
| 4,104,539 A | 8/1978 | Hase | |
| 4,564,767 A | 1/1986 | Charych | |
| 4,782,241 A | 11/1988 | Baker et al. | |
| 5,081,367 A | 1/1992 | Smith et al. | |
| 5,646,459 A | 7/1997 | Hatate et al. | |
| 5,686,768 A | 11/1997 | Thomsen et al. | |
| 5,751,564 A | 5/1998 | Dien | |
| 5,923,099 A | 7/1999 | Bilir | |
| 5,939,802 A | 8/1999 | Hornbeck | |
| 5,982,652 A | 11/1999 | Simonelli et al. | |
| 6,011,327 A | 1/2000 | Cook et al. | |
| 6,184,593 B1 | 2/2001 | Jungreis | |
| 6,191,500 B1 | 2/2001 | Toy | |
| 6,288,456 B1 | 9/2001 | Cratty | |
| 6,292,379 B1 * | 9/2001 | Edevold et al. | 363/71 |
| 6,295,215 B1 | 9/2001 | Faria et al. | |
| 6,330,176 B1 | 12/2001 | Thrap et al. | |
| 6,381,156 B1 * | 4/2002 | Sakai et al. | 363/65 |
| 6,433,444 B1 * | 8/2002 | de Vries | 307/64 |
| 6,465,910 B2 | 10/2002 | Young et al. | |
| 6,825,578 B2 | 11/2004 | Perttu | |
| 6,906,933 B2 | 6/2005 | Taimela | |
| 7,012,825 B2 * | 3/2006 | Nielsen | 363/142 |
| 7,050,312 B2 | 5/2006 | Tracy et al. | |
| 7,061,141 B2 * | 6/2006 | Yamamoto | 307/65 |
| 2002/0130556 A1 | 9/2002 | Hohri | |
| 2002/0134567 A1 | 9/2002 | Rasmussen et al. | |
| 2003/0034693 A1 | 2/2003 | Wareham et al. | |
| 2003/0048004 A1 | 3/2003 | Fleming et al. | |

(Continued)

FOREIGN PATENT DOCUMENTS

WO    WO 02/060032 A1    8/2002

*Primary Examiner*—Michael J Sherry
*Assistant Examiner*—Michael Rutland-Wallis
(74) *Attorney, Agent, or Firm*—Lowrie, Lando & Anastasi, LLP

(57) ABSTRACT

Methods and apparatus for delivering uninterruptible power to loads are provided. One aspect on the invention is directed to a system for providing power to a load. The system includes a first input to receive AC power from a first AC power source, a second input to receive AC power from a second AC power source, a third input to receive DC power from a first DC power source, an output that provides output AC power to the load, and converter circuitry, coupled to the first, second and third inputs, adapted to provide the output power derived from at least one of the first AC power source, the second AC power source and the first DC power source.

26 Claims, 6 Drawing Sheets

U.S. PATENT DOCUMENTS

| | | |
|---|---|---|
| 2003/0048005 A1 | 3/2003 | Goldin et al. |
| 2003/0062775 A1 | 4/2003 | Sinha |
| 2004/0084965 A1 * | 5/2004 | Welches et al. ............... 307/64 |
| 2004/0084967 A1 | 5/2004 | Nielsen |

* cited by examiner

UNINTERRUPTABLE POWER SUPPLY SYSTEM AND METHOD

FIELD OF THE INVENTION

The present invention relates generally to a system and method for providing redundant power to critical loads.

BACKGROUND OF THE INVENTION

The use of an uninterruptible power system (UPS) to provide power to a critical load is well known. Known uninterruptible power systems include on-line UPS's and off-line UPS's. On-line UPS's provide conditioned AC power as well as back-up AC power upon interruption of a primary source of AC power. Off-line UPS's typically do not provide conditioning of input AC power, but do provide back-up AC power upon interruption of the primary AC power source. FIG. 1 shows a block diagram of one type of on-line UPS 10. Other on-line UPS's are described in U.S. Pat. Nos. 5,982,652, and 5,686,768, both of which are incorporated herein by reference. On-line UPS's of the type described in the referenced patents are available from American Power Conversion Corporation, West Kingston, R.I. under the trade names Symmetra and Silcon. The UPS 10 of FIG. 1 includes an input circuit breaker/filter 12, a rectifier 14, a control switch 15, a controller 16, a battery 18, an inverter 20, an isolation transformer 22, and a bypass switch 23. The UPS also includes an input 24 for coupling to an AC power source, and an outlet 26 for coupling to a load.

The UPS 10 operates as follows. The circuit breaker/filter 12 receives input AC power from the AC power source through the input, filters the input AC power and provides filtered AC power to the rectifier 14. The rectifier rectifies the input voltage. The control switch 15 receives the rectified power and also receives DC power from the battery 18. The controller 16 determines whether the power available from the rectifier is within predetermined tolerances, and if so, controls the control switch to provide the power from the rectifier to the inverter 20. If the power from the rectifier is not within the predetermined tolerances, which may occur because of "brown out" or "black out" conditions, or due to power surges, then the controller controls the control switch to provide the DC power from the battery to the inverter 20.

The inverter 20 of the UPS 10 receives DC power and converts the DC power to AC power and regulates the AC power to predetermined specifications. The inverter 20 provides the regulated AC power to the isolation transformer 22. The isolation transformer is used to increase or decrease the voltage of the AC power from the inverter and to provide isolation between a load and the UPS. The isolation transformer is typically an optional device, the use of which is typically dependent on UPS output power specifications. Depending on the capacity of the battery and the power requirements of the load, the UPS 10 can provide power to the load during brief power source dropouts or for extended power outages. The bypass switch 23 is used to provide a bypass of UPS circuitry to provide the input power directly to the output. The bypass switch may be controlled by the controller 16 to provide bypass of the UPS circuitry upon a failure condition of the UPS.

To provide further power redundancy, it is known to supply power to a bypass switch of a UPS from a second source of AC power as shown in FIG. 2. One problem with this approach is that in bypass mode, the load receives unconditioned power and the source and the load must be able to handle transients that may occur when the load is transferred to the second AC source. In some systems, to minimize transients, the first and second AC sources are required to be substantially synchronous and have substantially the same voltage. To at least partially overcome these problems, a second UPS may be installed in line with the second AC source, but such a solution can be quite expensive since two UPS's are used.

SUMMARY OF THE INVENTION

Embodiments of the present invention provide improved high power availability solutions.

A first aspect of the present invention is directed to a system for providing power to a load. The system includes a first input to receive AC power from a first AC power source, a second input to receive AC power from a second AC power source, a third input to receive DC power from a first DC power source, an output that provides output AC power to the load, and converter circuitry, coupled to the first, second and third inputs, adapted to provide the output power derived from at least one of the first AC power source, the second AC power source and the first DC power source.

The system may further include a first bypass device coupled to the first input and the output and controllable to operate in a bypass mode to couple the first input to the output to provide AC power from the first AC power source directly to the output, bypassing the converter circuitry. The system may include a second bypass device coupled to the second input and the output and controllable to operate in a bypass mode to couple the second input to the output to provide AC power from the second AC power source directly to the output, bypassing the converter circuitry. The converter circuitry can include a plurality of controllable switches, each of the controllable switches being coupled to one of the first, second and third inputs to control current draw by the converter circuitry from the first AC power source, the second AC power source and the DC power source; wherein, in a first power source transition mode, the converter circuitry is adapted to detect an input AC voltage waveform period of the first AC power source and to control the controllable switches such that the converter circuitry draws current from the first AC power source during a first portion of the period and the converter circuitry draws current from the first DC power source during a second portion of the period for multiple periods. The system may operate in a second power source transition mode, and the converter circuitry may be adapted to detect an input AC voltage waveform period of the second AC power source and to control the controllable switches such that the converter circuitry draws current from the second AC power source during a first portion of the period and the converter circuitry draws current from the first DC power source during a second portion of the period for multiple periods.

The system can still further include a fourth input to receive DC power from a second DC power source, and the converter circuitry can be coupled to the fourth input through a controllable switch that is controlled in the first transition mode to draw current from the second DC power source during the first portion of the period for multiple periods. The converter circuitry can include a first DC regulator circuit having an input and having an output that produces a first DC voltage, and a second DC regulator circuit having an input and having an output that produces a second DC voltage, and the input of the first DC regulator circuit can be coupled to the first input of the system through a first one of the plurality of controllable switches, the input of the first DC regulator circuit can be coupled to the second input through a second one of the plurality of controllable switches, the input of the first DC circuit can be coupled to the third input through a third one of the plurality of controllable switches, the input of the second DC regulator can be coupled to the first input of the system through a fourth one of the controllable switches, the input of the second DC regulator can be coupled to the second input of the system through a fifth one of the controllable switches, and the input of the second DC regulator can be coupled to the fourth input of the system through a sixth one of the plurality of controllable switches.

In the system, the first DC voltage may be approximately the same magnitude and opposite polarity of the second DC voltage. The system can further include a DC to AC converter coupled to the outputs of the first and second DC regulator circuits and the output of the system to provide output AC power derived from the first DC voltage and the second DC voltage. Each of the controllable switches can include a thyristor. The system can further include the first DC source and the second DC source with a source voltage of the first DC source being of approximately equal magnitude and opposite polarity of a source voltage of the second DC source.

Another aspect of the invention is directed to a system for providing power to a load. The system includes a first input to receive AC power from a first AC power source, a second input to receive AC power from a second AC power source, a third input to receive DC power from a first DC power source, an output that provides output AC power to the load; and converter means, coupled to the first, second and third inputs, for providing output power derived from at least one of the first AC power source, the second AC power source and the first DC power source.

In implementations, the system may further include bypass means for selectively providing AC power from the first power source directly to the output, bypassing the converter means. The bypass means may include means for selectively providing AC power from the second power source directly to the output, bypassing the converter means. The converter means may include means for transitioning a draw of input current by the converter means from the first AC power source at the first input to the first DC power source at the third input, such that during a first transition period, input current is drawn by the converter means alternately from the first AC power source and the first DC power source. The converter means may include means for transitioning a draw of input current by the converter means from the first DC power source at the third input to the second AC power source at the second input, such that during a second transition period, input current is drawn by the converter means alternately from the first DC power source and the second AC power source.

The system may further include a fourth input to receive DC power from a second DC power source, and the converter means may include means for transitioning a draw of input current by the converter means from the first AC power source at the first input to the second DC power source at the fourth input, such that during the first transition period, input current is drawn by the converter means alternately from the first AC power source and the second DC power source. The converter means may include means for transitioning a draw of input current by the converter means from the second DC power source at the fourth input to the second AC power source at the second input, such that during the second transition period, input current is drawn by the converter means alternately from the second DC power source and the second AC power source. The converter means may include regulator means for producing a first regulated DC voltage, and a second regulated DC voltage. The first regulated DC voltage may be approximately the same magnitude and opposite polarity of the second regulated DC voltage. The system may further include means for converting the first regulated DC voltage and the second regulated DC voltage to an AC voltage to provide output AC power. The system may further include the first DC power source and the second DC power source with a source voltage of the first DC power source being of approximately equal magnitude and opposite polarity of a source voltage of the second DC power source.

Another aspect of the invention is directed to a method of providing power to a load using an uninterruptible power supply (UPS) having a first input that can be selectively coupled to a first AC source, a second AC source, and a first DC source. The method includes coupling the first input of the UPS to the first AC source and providing output power to a load based on AC power from the first AC source, detecting a loss of the first AC source, coupling the first input of the UPS to the first DC source and providing output power from the UPS based on DC power from the first DC source, and transitioning a draw of input current at the first input from the first DC source to the second AC source by alternately coupling the first DC source and the second AC source to the first input of the UPS. In implementations, the method may further include further comprising detecting return of the first AC Source, transitioning a draw of input current at the first input from the second AC source to the first DC source by alternately coupling the second AC source and the first DC source to the first input of the UPS, and transitioning a draw of input current at the first input from the first DC source to the first AC source by alternately coupling the first DC source and the first AC source to the first input of the UPS. The UPS may have a second input that can be selectively coupled to the first AC source, the second AC source, and a second DC source, and the method can further include coupling the second input of the UPS to the first AC source and providing output power to a load based on AC power from the first AC source, after detecting the loss of the first AC source, coupling the second input of the UPS to the second DC source and providing output power from the UPS based on DC power from the second DC source, and transitioning a draw of input current at the second input from the second DC source to the second AC source by alternately coupling the second DC source and the second AC source to the second input of the UPS. The method can further include detecting the return of the first AC Source, transitioning a draw of input current at the second input from the second AC source to the second DC source by alternately coupling the second AC source and the second DC source to the second input of the UPS, and transitioning a draw of input current at the second input from the second DC source to the first AC source by alternately coupling the second DC source and the first AC source to the second input of the UPS.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
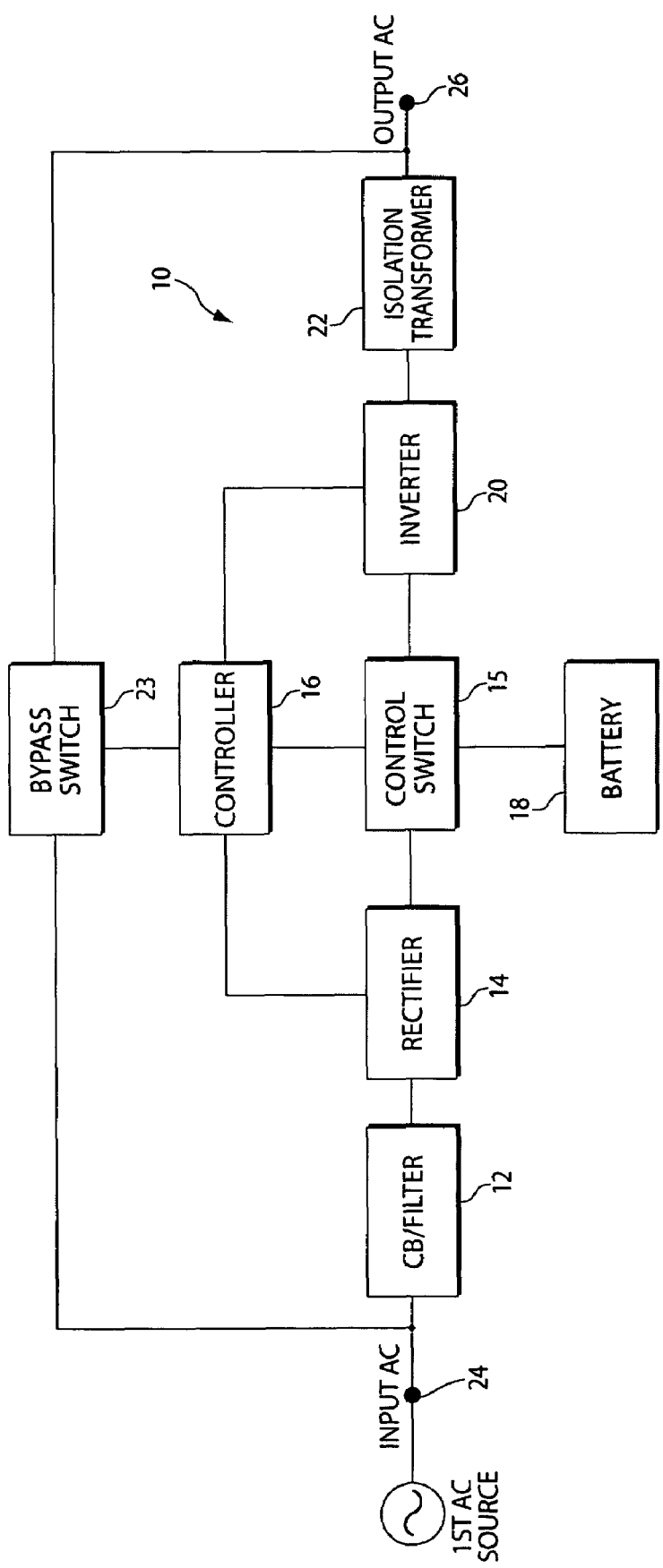
FIG. 1 is a functional block diagram of a first prior art UPS system.
Figure 2:
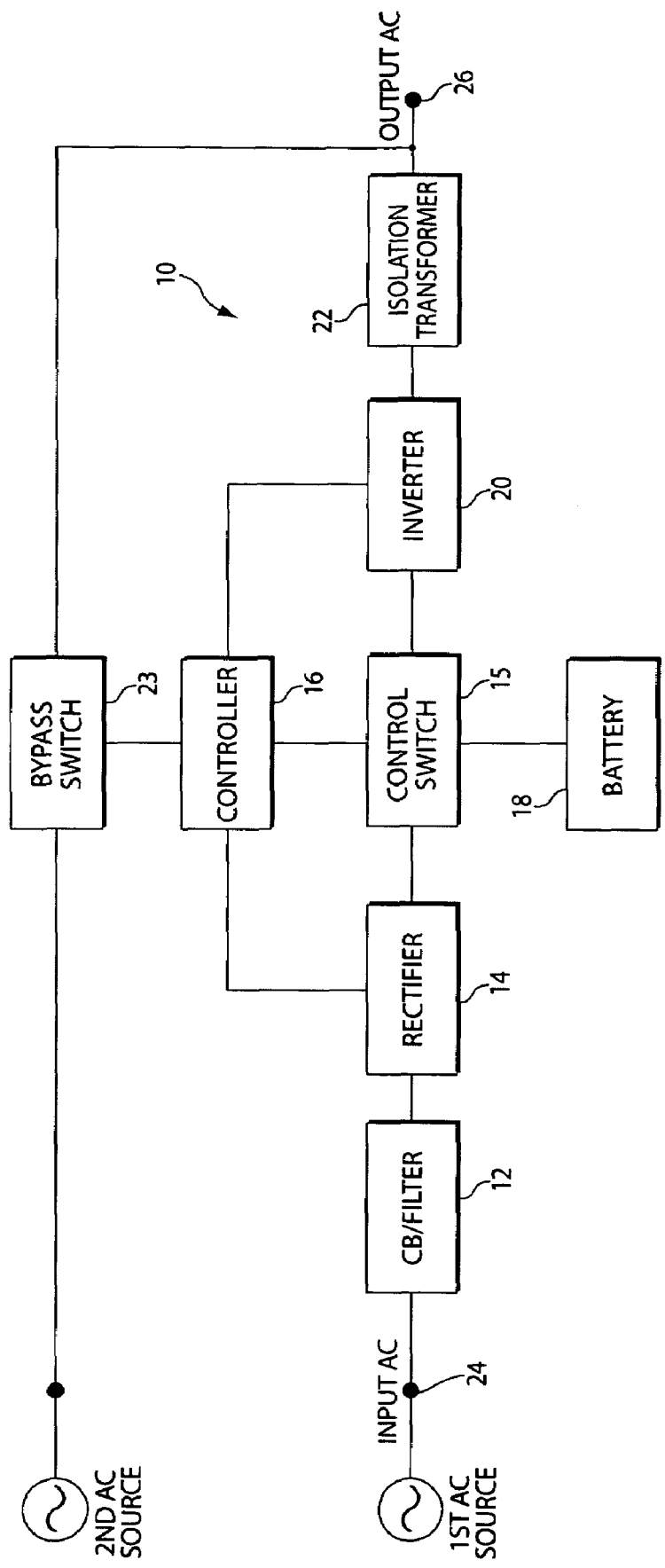
FIG. 2 is a functional block diagram of a second prior art UPS system.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Embodiments of the present invention provide cost-effective, high availability power solutions. One embodiment of a high availability power system 100 in accordance with the present invention will now be described with reference to FIG. 3. The system 100 shown in FIG. 3 includes a single UPS 108 having an input 118 to receive AC power and an output 106 that provides AC power. The system 100 further includes first and second inputs 102 and 104 for coupling to independent sources of AC power, a first input stage 110, a second input stage 112, a first bypass switch 114 and a second bypass switch 116.

Figure 3:
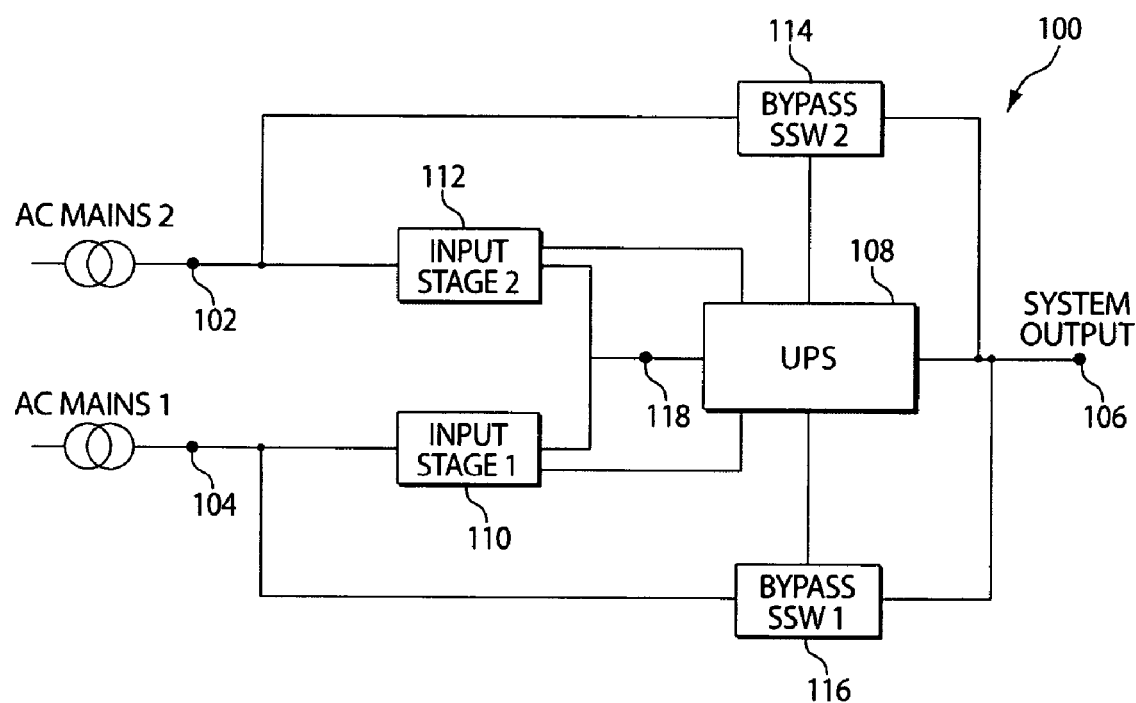
FIG. 3 is a functional block diagram of a power supply system in accordance with one embodiment of the invention.

In the system 100, the UPS 108 is an on-line UPS and may be implemented using, for example, one of a number of UPS's available from American Power Conversion, Corporation, West Kingston, R.I. including the Symmetra UPS's and the Silcon UPS's. The input stages 110 and 112 may be implemented using a number of known switches such as mechanical switches, static switches or the switching function may be integrated into a rectifier stage of the UPS that controls the source of power flow into the UPS. In addition, although shown as two separate devices, the two input stages may be implemented using one device that selects one of the two input power sources as the output power source. The bypass switches 114 and 116 and the input stages 110 and 112 may be controlled by a controller contained within the UPS, and as shown in FIG. 3, may have control lines coupled to the UPS to allow control by a controller within the UPS. In addition to the bypass switches 114 and 116, the UPS may have an internal bypass device as described above with reference to the UPS 10 of FIG. 1.

Figure 4:
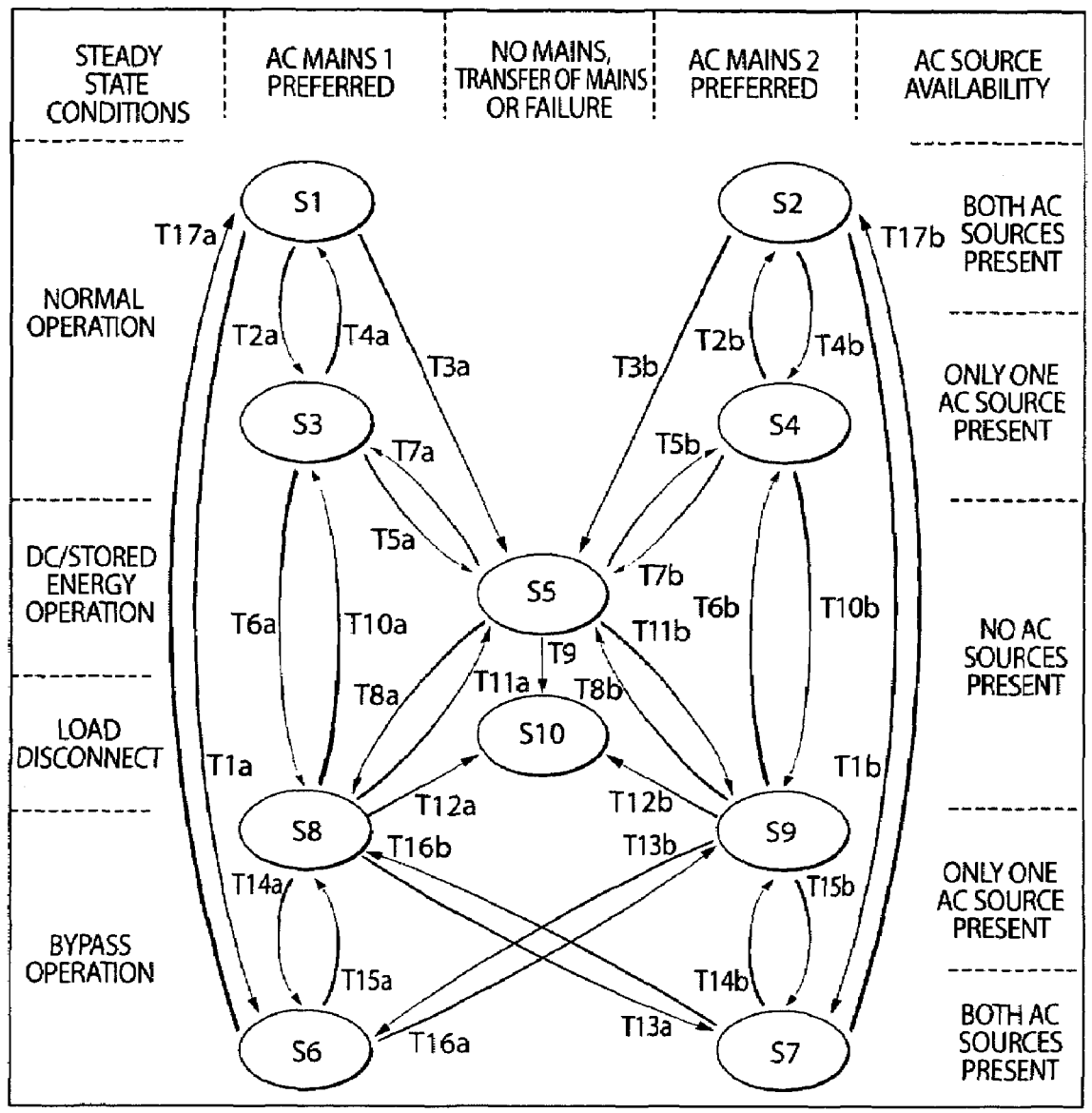
FIG. 4 is a state diagram showing operational states of systems of embodiments of the present invention.

The system 100 provides considerable options that enable power to be provided to the load upon failure of the UPS, upon failure of either of the input AC power sources, and upon failure of both of the input AC sources. A description of the operation of the system 100 will now be provided with reference to Tables 1 and 2 and FIG. 4. Table 1 includes a summary of operational modes of system 100, FIG. 4 provides a state diagram for the system 100, and Table 2 provides a description of the conditions for transfer in the state diagram of FIG. 4.

TABLE 1

Operational States of System 100

| State | State description | Input stage 110 | Input stage 112 | Bypass switch 114 | Bypass Switch 116 | UPS 108 |
|---|---|---|---|---|---|---|
| S1 | Normal operation Both supplies present AC Mains 1 operation preferred | Active | Inactive | Inactive But ready | Inactive | Active on mains |
| S2 | Normal operation Both AC supplies present AC Mains 2 operation preferred | Inactive | Active | Inactive | Inactive But ready | Active on mains |
| S3 | Normal operation AC Mains 2 not present AC Mains 1 operation | Active | Inactive | Inactive | Inactive But ready | Active on mains |
| S4 | Normal operation AC Mains 1 not present AC Mains 2 operation | Inactive | Active | Inactive But ready | Inactive | Active on mains |
| S5 | DC operation (stored energy mode) AC Mains 1 and 2 not present | Inactive | Inactive | Inactive | Inactive | Active on backup power |
| S6 | Bypass operation Both AC supplies present AC mains 1 operation preferred | Inactive | Inactive | Active | Inactive But ready | Inactive or failed |

TABLE 1-continued

Operational States of System 100

| State | State description | Input stage 110 | Input stage 112 | Bypass switch 114 | Bypass Switch 116 | UPS 108 |
|---|---|---|---|---|---|---|
| S7 | Bypass operation Both AC supplies present AC mains 2 operation preferred | Inactive | Inactive | Inactive But ready | Active | Inactive or failed |
| S8 | Bypass operation AC Mains 2 not present AC Mains 1 operation | Inactive | Inactive | Active | Inactive | Inactive or failed |
| S9 | Bypass operation AC Mains 1 not present AC Mains 2 operation | Inactive | Inactive | Inactive | Active | Inactive or failed |
| S10 | Load disconnect AC Mains 1 and 2 not present | Inactive | Inactive | Inactive | Inactive | Inactive or failed |

In Table 1, in states S1 through S4, the system 100 is operating in normal operation with the load supplied with conditioned power and with backup power available. In state S5, the system is in DC/stored energy mode of operation, and the load is supplied with conditioned power. In states S6 through S9, the system is operating in an overload or fault condition with the load being powered through a bypass switch from one of the input power sources. In state S10, the system is in a fault condition or missing AC sources with the batteries having been fully drained. In Tables 1 and 2 and in FIG. 4, reference is made to a preferred AC source. In embodiments of the present invention, one of multiple AC sources may be designated as a preferred source that will be used when multiple sources are available. The system 100 is configured to transfer between states to continue to provide power to a load. The state diagram of FIG. 4 shows transfers between states that can occur, and Table 2 provides further description of the transfers shown in FIG. 4.

TABLE 2

UPS 100 State Transfers

| Transfer State | Condition for transfer | Starting state | End state | Output effect |
|---|---|---|---|---|
| T1a | Internal failure in | S1 | S6 | None except that load no longer supplied with conditioned power |
| T1b | UPS | S2 | S7 | |
| T2a | The non- | S1 | S3 | None |
| T2b | preferred AC mains disappears | S2 | S4 | |
| T3a | The preferred AC | S1 | S5 | None |
| T3b | mains disappears | S2 | S5 | |
| T4a | The non- | S3 | S1 | None |
| T4b | preferred AC mains reappears | S4 | S2 | |
| T5a | The remaining | S3 | S5 | None if either mains reappear before DC source is drained |
| T5b | AC mains disappears | S4 | S5 | |
| T6a | Internal failure in | S3 | S8 | None except that load no longer supplied with conditioned power |
| T6b | UPS or overload | S4 | S9 | |
| T7a | The preferred AC | S5 | S3 | None except that load is once again supplied with conditioned power |
| T7b | mains reappear | S5 | S4 | |

TABLE 2-continued

UPS 100 State Transfers

| Transfer State | Condition for transfer | Starting state | End state | Output effect |
|---|---|---|---|---|
| T8a | Internal failure in | S5 | S8 | None except that load no longer supplied with conditioned power |
| T8b | UPS or DC backup drained | S5 | S9 | |
| T9 | DC backup drained | S5 | S10 | Load dropped |
| T10a | Overload | S8 | S3 | None except that load is once again supplied with conditioned power |
| T10b | disappears | S9 | S4 | |
| T11a | The remaining | S8 | S5 | None if either mains reappear before DC source is drained |
| T11b | AC mains disappears and DC backup possible | S9 | S5 | |
| T12a | The remaining | S8 | S10 | Load dropped |
| T12b | AC mains disappears and DC backup not possible | S9 | S10 | |
| T13a | The preferred AC | S8 | S7 | None |
| T13b | mains reappears | S9 | S6 | |
| T14a | The non- | S8 | S6 | None |
| T14b | preferred AC mains disappears | S9 | S7 | |
| T15a | The non- | S6 | S8 | None |
| T15b | preferred AC mains reappears | S7 | S9 | |
| T16a | The preferred AC | S6 | S9 | None |
| T16b | mains disappears | S7 | S8 | |
| T17a | Failure in UPS | S6 | S1 | None except that load supplied with conditioned power |
| T17b | corrected | S7 | S2 | |

For example, with reference to FIG. 4 and Table 2, when the system is in steady state S1, and the preferred power source disappears, the system will perform transfer T3a to state S5 to operate in battery mode, and will then perform transfer T7b to operate in state S4 using the secondary AC source. As discussed below in greater detail, in some embodiments of the present invention, when transitioning from one AC input source to another, the DC mode (state S5) is used to provide a gradual transfer between power sources that may not be synchronous and may have different output voltage levels. The combination of transfers T3a and T7b can be used to accomplish this gradual transfer. In other embodiments of the present invention, transfers may occur directly between states S1 and S4 and between states S2 and S3.

One of the most significant advantages of embodiments of power systems of the present invention is the flexibility to provide power under a number of fault conditions. In addition to the operating modes described above with reference to Tables 1 and 2, other modes of operation may be used with systems of the present invention. For example, when operating in normal mode (S1), and the UPS goes down, rather than transferring to state S6 as shown in the diagram, the system can transfer to state S7, operating in bypass mode with the second AC source. Similarly, when operating in normal mode (S2) and the UPS goes down, the system could transfer to state S6 operating in bypass mode with the first AC source.

In the embodiment of the invention described above, input stages and the bypass switches of system 100 are shown as being devices separate from the UPS 108. In other embodiments of the present invention, the input stages and the bypass switches may be incorporated within the chassis of a UPS that has multiple power inputs for receiving AC and/or DC power.

Figure 5:
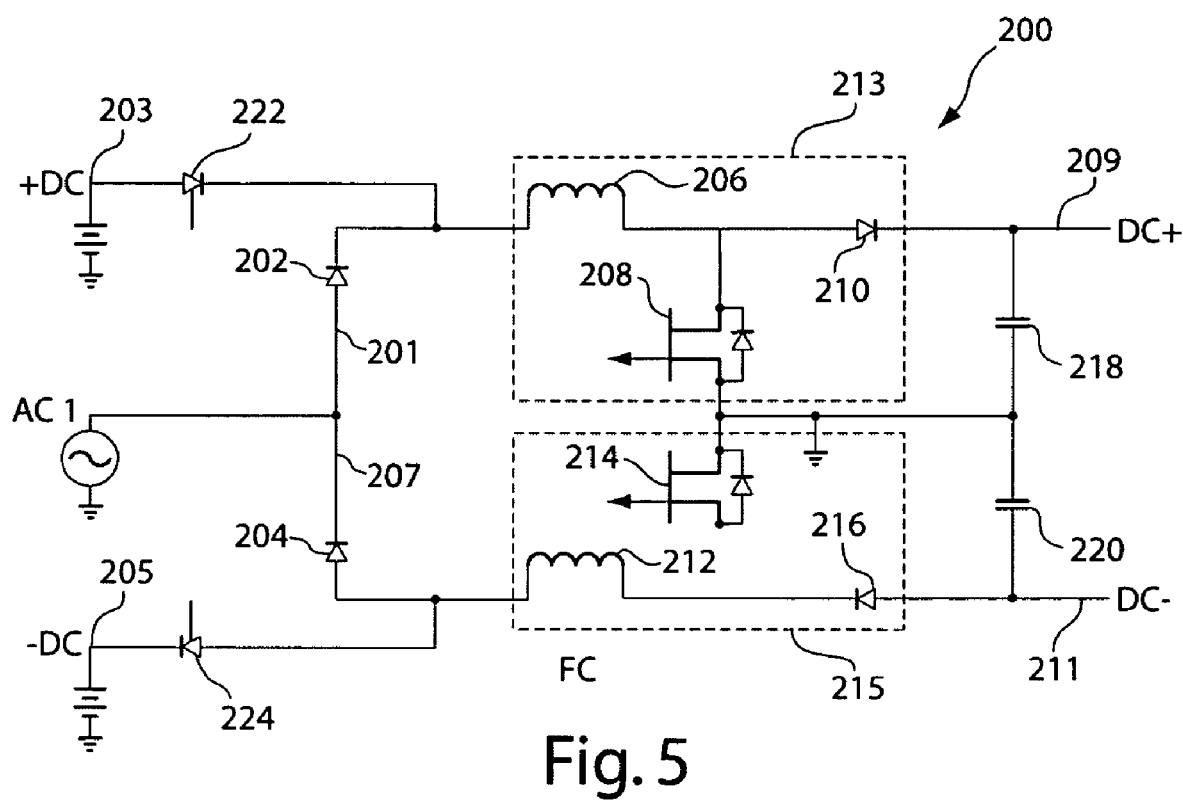
FIG. 5 is a functional block diagram of a UPS system that may be used in embodiments of the invention.

"In typical UPS systems when the input power source is changed from an AC power source to a DC power source or from a DC source back to an AC source, the change is usually an abrupt change that results in power being drawn from only one source before and after the changeover. In one UPS system 200, described in copending U.S. patent application Ser. No. 10/470,124 (U.S. Pat. No. 7,012,825), titled Combined AC-DC to DC Converter, filed Jul. 25, 2003, assigned to the assignee of the present invention, and incorporated herein by reference, a smooth gradual transition of power between an AC source and a DC source can be achieved. FIG. 5 shows a schematic diagram of an input portion of the UPS system 200. The UPS system 200 has two input DC ports 203, 205, two AC input ports 201, 207 and has two output DC ports 209 and 211. The input DC ports may be internal to the UPS 200 and be coupled to a battery or batteries contained within the UPS 200. The AC ports are designed to receive power from an external AC power source The output DC ports couple to a DC to AC converter (not shown) that provide output AC power from the UPS."

The UPS 200 includes two diodes 202 and 204, two thyristors 222 and 224, a positive boost converter 213, a negative boost converter 215, and output capacitors 218 and 220. The positive boost converter includes an inductor 206, a transistor 208 and a diode 210, and similarly, the negative boost converter includes an inductor 212, a transistor 214 and a diode 216.

The UPS 200 operates as follows. In AC mode, AC voltage is rectified by diodes 202 and 204 to provide positive voltage at the input of the positive boost converter and negative voltage at the input of the negative boost converter. The positive boost converter generates a positive DC voltage across capacitor 218, and the negative boost converter generates a negative DC voltage across capacitor 220. A controller is used to control the boost converters to provide regulated output voltages. Upon interruption of the AC voltage, the controller provides a signal to thyristors 222 and 224 to allow positive and negative backup DC voltages from, for example, batteries to be applied to the inputs of the boost converters. Under control of the controller, the boost converters generate the regulated voltages across the output capacitors from the DC voltages.

Figure 6:
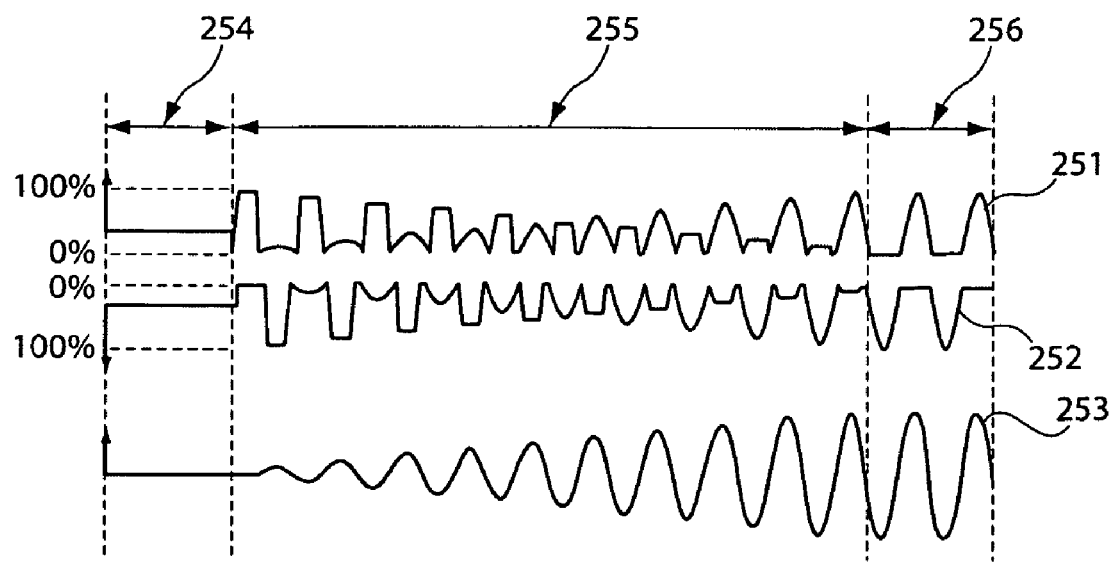
FIG. 6 is a graph of voltage and current waveforms in UPS systems of embodiments of the invention.

Upon return of the AC power source, as the AC voltage ramps up to the full voltage value, the UPS 200 provides a gradual transition from DC power back to AC power. FIG. 6 shows current waveforms 251 and 252 through inductors 206 and 212 for different modes of operation of the UPS 200. Waveform 253 represents the total current supplied by the AC source. During the period of time 254, current is provided solely from the batteries. During the period of time 255, a transition occurs from battery to the AC source, with the amount of current supplied by the batteries slowly decreasing, and the amount of current supplied by the AC source, slowly increasing. The controller, in conjunction with detection circuits incorporated into the UPS 200 ensures that the total current drawn is sufficient to meet load requirements while providing the transition from the batteries to the AC source. During the transition period 255, the thyristors are controlled to allow battery current to be supplied to an inductor when there is no current from the AC source. The inductor 206 only receives AC current during the positive portion of the input AC waveform, and inductor 212 only receives AC current during the negative portion of the input AC waveform. DC battery current is supplied, as shown in FIG. 6, when AC current is not present. During period 256, current is provided only from the AC source and not from the batteries.

Figure 7:
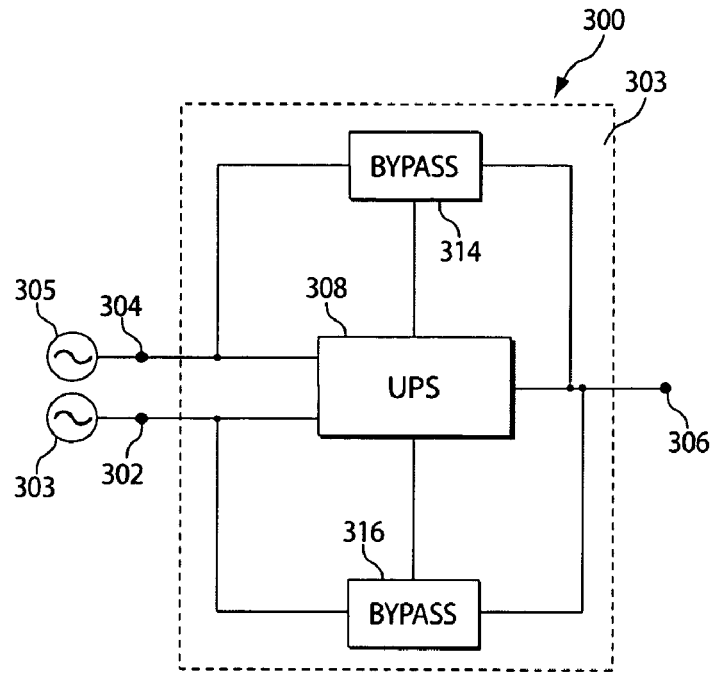
FIG. 7 is a functional block diagram of a power supply system in accordance with another embodiment of the invention.
Figure 8:
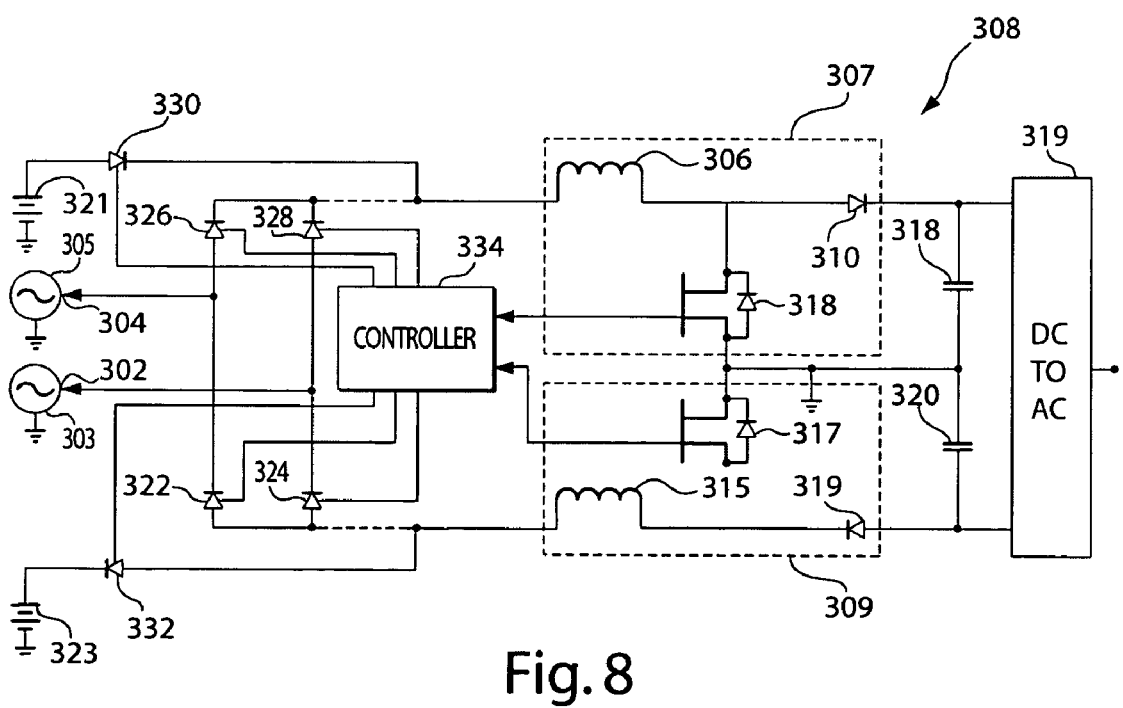
FIG. 8 is a schematic diagram of a UPS used in the embodiment of FIG. 7.

A second embodiment of the present invention of a system 300 for providing redundant power to loads includes input stages, incorporated within a UPS, that provide selective coupling to a plurality of power sources. The system 300 will now be described with reference to FIGS. 7 and 8. FIG. 7 shows a block diagram of the system 300, and FIG. 8 shows a schematic diagram of a UPS 308 used in the system 300. The system 300 includes the UPS 308, AC inputs 302 and 304 for coupling to AC sources 303 and 305, a system AC output 306, and bypass switches 314 and 316. The UPS and the bypass switch may be installed in a common chassis or rack designed as item 303 in FIG. 7. The bypass switches 314 and 316 are similar to bypass switches 114 and 116 discussed above, and in some embodiments may be incorporated within the UPS 308. System 300 operates in a manner similar to system 100 described above, using the operational modes shown in Tables 1 and 2 and in FIG. 4. In system 300, input stages are incorporated within the UPS 308, while in system 200 the input stages are shown as discrete devices located external to the UPS 208.

The UPS 308 is coupled to the AC inputs 302 and 304 and to the AC output 306 and is designed to provide output power at the AC output derived from either one of the AC inputs or batteries within the UPS. The UPS 308 includes input thyristors 322, 324, 326, 328, 330 and 332, a positive battery 321, a negative battery 323, a positive boost converter 307, a negative boost converter 309, output capacitors 318 and 320, a DC to AC converter 319, and a controller 334. The controller may have several inputs to receive voltage and current signals representative of voltage and current levels at monitoring points in the system. In addition, the controller may be coupled to control bypass switches 314 and 316. The positive boost converter includes an inductor 306, a transistor 318 and a diode 310. The negative boost converter includes an inductor 315, a transistor 317, and a diode 319. Input thyristors 322, 324, 326, and 328 under control of the controller 334 provide the function of the input stages discussed above to selectively couple the AC sources at the AC inputs to the boost converters of the UPS 308. Input thyristor 330 is used to selectively couple battery 321 to the positive boost converter, and input thyristor 332 is used to selectively couple the negative battery 323 to the negative boost converter.

The system 300, including the UPS 308 operates in the modes of operation described above in Tables 1 and 2. In addition, the UPS 308 provides an additional feature of allowing for smooth transition from operating in battery mode to operating in AC mode from either an AC source at the first AC input or an AC source at the second AC input. In normal mode of operation (state S1), power at the first AC input, is coupled to the positive boost converter 307 through thyristor 326 for positive AC input voltage, and power at the first AC input is coupled to the negative boost converter 309 through thyristor 330 for negative AC input voltage. The positive boost converter generates a positive DC voltage across capacitor 318, and the negative boost converter generates a negative DC voltage across capacitor 320. The DC to AC converter converts the DC voltage across capacitors 318 and 320 into the output AC voltage.

Upon failure of the AC source at input 1, while in normal mode of operation (state S1), the controller turns on thyristors 330 and 332 to generate the output AC power from the batteries 321 and 323 (state S5). If AC power is available from a second AC source at input 304, then to save battery life, the controller 334 transitions the power draw from the batteries to the second AC source in the manner described above with reference to FIGS. 3 and 5 (state S4). If the first AC source becomes available once again, then the controller can provide a smooth transition from the second AC source to battery power (state S5) and from battery power back to the first AC source (state S1). For transitions from DC power to AC power, the current through inductors 306 and 315 will respectively follow the waveforms 251 and 252 during period 255 of FIG. 6. For transition from a live AC source to DC power, the current transition is the reverse of that shown in waveforms 251 and 252 during period 255 as the current transforms from AC to DC, or alternatively the transition from AC to DC may be an abrupt change.

There are several advantages to the multiple input stage systems of embodiments of the present invention described above. The systems allow independent AC input sources to be used and the systems can tolerate independent frequency and phase variations of the AC input sources. In addition, in the system 308, the input voltages of the AC input sources do not have to be the same. The boost converters can be controlled to allow for some differences in the input voltage and still provide a regulated DC voltage across the output capacitors.

As discussed above, the system 300 allows transfer from one AC source to another AC source via DC (battery operation). This allows, for example, a generator set to be used as the second source of AC power, with the ability to provide for a smooth transfer from a first source of AC power to a generator set. The input stages of the system 300 allow the generator set to be permanently coupled to the UPS 308 without the need for additional switch gear. This allows the load to be supplied with conditioned power and backup power while running from a generator, which can be a significant advantage, as the frequency of the output voltage from a generator is not typically very stable. Further, the output voltages of generators are often sensitive to sudden load changes when transfer switches are used.

The system 300 and UPS 308 of the embodiment described above includes two AC inputs. In other embodiments additional AC inputs, with associated input thyristors, may be added to increase the power availability of the system. Further, additional DC sources may be added to the system and be coupled to the UPS using thyristors, or other switches, as described above. In some embodiments that use multiple DC sources, transistors are used in place of the thyristors to allow different DC voltage levels to be used for the sources. In the system 300, bypass switches 314 and 316 are shown external to the UPS of the system, in other embodiments, the bypass switches may be located internal to the UPS, and whether internal to the UPS or external to the UPS may be controlled by a controller of the UPS.

The system 300 described above uses a split battery configuration that produces both a positive and a negative DC voltage. In other embodiments, only one battery may be used with a converter, for example a buck-boost converter, to generate a negative DC voltage or in some embodiments, only a positive DC voltage may be used. Also sources other than batteries may be used to provide DC power at DC inputs in embodiments of the present invention, and the DC sources, as well as the batteries may be external to the UPS.

In embodiments of the invention described above, power systems having improved power availability are described. In at least some embodiments of the present invention, modular, redundant UPS's, such as those described in U.S. Pat. No. 5,982,652 may be used as the UPS in the power systems to provide additional power availability. In addition, embodiments of the present invention may be used with UPS's like that shown in FIG. 1, as well as other types of UPS's.

In the embodiments described above, the input AC voltage is a single phase AC input. In other embodiments, three phase inputs and/or three phase outputs may be accommodated.

In embodiments described above, thyristors are used to provide controlled switching of power sources to UPS's, in other embodiments, other types of switches may be used to perform the switching function, including transistors and other semiconductor devices.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A system for providing power to a load, the system comprising:
    a first input to receive AC power from a first AC power source;
    a second input to receive AC power from a second AC power source;
    a third input to receive DC power from a first DC power source;
    an output that provides output AC power to the load;
    converter circuitry, coupled to the first, second and third inputs and the output, and controllable to select from the first AC power source, the second AC power source and the first DC power source to provide input power and derive the output AC power from the input power;
    a first bypass device coupled to the first input and the output and controllable to operate in a bypass mode to couple the first input to the output to provide AC power from the first AC power source directly to the output, bypassing the converter circuitry; and
    a second bypass device coupled to the second input and the output and controllable to operate in a bypass mode to couple the second input to the output to provide AC power from the second AC power source directly to the output, bypassing the converter circuitry;
    wherein the converter circuitry includes a plurality of controllable switches, each of the controllable switches being coupled to one of the first, second and third inputs to control current draw by the converter circuitry from the first AC power source, the second AC power source and the first DC power source;

wherein, in a first power source transition mode, the converter circuitry is adapted to detect an input AC voltage waveform period of the first AC power source and to control the controllable switches such that the converter circuitry draws current from the first AC power source during a first portion of the waveform period and the converter circuitry draws current from the first DC power source during a second portion of the waveform period for multiple waveform periods;

wherein, in a second power source transition mode, the converter circuitry is adapted to detect an input AC voltage waveform period of the second AC power source and to control the controllable switches such that the converter circuitry draws current from the second AC power source during a first portion of the waveform period and the converter circuitry draws current from the first DC power source during a second portion of the waveform period for multiple waveform periods;

further comprising a fourth input to receive DC power from a second DC power source, and wherein the converter circuitry is coupled to the fourth input through a controllable switch that is controlled in the first transition mode to draw current from the second DC power source during the first portion of the waveform period for multiple waveform periods.

2. The system of claim 1, wherein the converter circuitry includes a first DC regulator circuit having an input and having an output that produces a first DC voltage, and a second DC regulator circuit having an input and having an output that produces a second DC voltage, and wherein the input of the first DC regulator circuit is coupled to the first input of the system through a first one of the plurality of controllable switches, the input of the first DC regulator circuit is coupled to the second input through a second one of the plurality of controllable switches, the input of the first DC regulator circuit is coupled to the third input through a third one of the plurality of controllable switches, the input of the second DC regulator circuit is coupled to the first input of the system through a fourth one of the controllable switches, the input of the second DC regulator circuit is coupled to the second input of the system through a fifth one of the controllable switches, and the input of the second DC regulator circuit is coupled to the fourth input of the system through a sixth one of the plurality of controllable switches.

3. The system of claim 2, wherein the first DC voltage has approximately the same magnitude and opposite polarity of the second DC voltage.

4. The system of claim 3, further comprising a DC to AC converter coupled to the outputs of the first and second DC regulator circuits and the output of the system to provide output AC power derived from the first DC voltage and the second DC voltage.

5. The system of claim 4, wherein each of the controllable switches includes a thyristor.

6. The system of claim 5, further comprising the first DC source and the second DC source with a source voltage of the first DC source being of approximately equal magnitude and opposite polarity of a source voltage of the second DC source.

7. A system for providing power to a load, the system comprising:
a first input to receive AC power from a first AC power source;
a second input to receive AC power from a second AC power source;
a third input to receive DC power from a first DC power source;
an output that provides output AC power to the load; and
converter circuitry, coupled to the first, second and third inputs and the output, adapted to provide the output AC power derived from at least one of the first AC power source, the second AC power source and the first DC power source;

wherein the converter circuitry includes a plurality of controllable switches, each of the controllable switches being coupled to one of the first, second and third inputs to control current draw by the converter circuitry from the first AC power source, the second AC power source and the first DC power source; wherein, in a first power source transition mode, the converter circuitry is adapted to detect an input AC voltage waveform period of the first AC power source and to control the controllable switches such that the converter circuitry draws current from the first AC power source during a positive portion of the waveform period and the converter circuitry draws current from the first DC power source during a negative portion of the waveform period for multiple waveform periods;

wherein, in a second power source transition mode, the converter circuitry is adapted to detect an input AC voltage waveform period of the second AC power source and to control the controllable switches such that the converter circuitry draws current from the second AC power source during a positive portion of the waveform period and the converter circuitry draws current from the first DC power source during a negative portion of the waveform period for multiple waveform periods;

further comprising a fourth input to receive DC power from a second DC power source, and wherein the converter circuitry is coupled to the fourth input through a controllable switch that is controlled in the first power source transition mode to draw current from the second DC power source during the positive portion of the waveform period for multiple waveform periods.

8. A system for providing power to a load, the system comprising:
a first input to receive AC power from a first AC power source;
a second input to receive AC power from a second AC power source;
a third input to receive DC power from a first DC power source;
an output that provides output AC power to the load;
converter circuitry, coupled to the first, second and third inputs and the output, adapted to provide the output AC power derived from at least one of the first AC power source, the second AC power source and the first DC power source, wherein the converter circuitry includes a plurality of controllable switches, each of the controllable switches being coupled to one of the first, second and third inputs to control current draw by the converter circuitry from the first AC power source, the second AC power source and the first DC power source; wherein, in a first power source transition mode, the converter circuitry is adapted to detect an input AC voltage waveform period of the first AC power source and to control the controllable switches such that the converter circuitry draws current from the first AC power source during a first portion of the period and the converter circuitry draws current from the first DC power source during a second portion of the period for multiple periods; and a fourth input to receive DC power from a second DC power source, and wherein the converter circuitry is coupled to the fourth input through a controllable switch that is controlled in the first power source transition mode to draw current from the second DC power source during the first portion of the period for multiple periods;

wherein the converter circuitry includes a first DC regulator circuit having an input and having an output that produces a first DC voltage, and a second DC regulator circuit having an input and having an output that produces a second DC voltage, and wherein the input of the first DC regulator circuit is coupled to the first input of the system through a first one of the plurality of controllable switches, the input of the first DC regulator circuit is coupled to the second input through a second one of the plurality of controllable switches, the input of the first DC regulator circuit is coupled to the third input through a third one of the plurality of controllable switches, the input of the second DC regulator circuit is coupled to the first input of the system through a fourth one of the controllable switches, the input of the second DC regulator circuit is coupled to the second input of the system through a fifth one of the controllable switches, and the input of the second DC regulator circuit is coupled to the fourth input of the system through a sixth one of the plurality of controllable switches.

9. The system of claim 8, wherein the first DC voltage has approximately the same magnitude and opposite polarity of the second DC voltage.

10. The system of claim 8, further comprising a DC to AC converter coupled to the outputs of the first and second DC regulator circuits and the output of the system to provide output AC power derived from the first DC voltage and the second DC voltage.

11. The system of claim 7, wherein each of the controllable switches includes a thyristor.

12. The system of claim 7, further comprising the first DC power source and the second DC power source with a source voltage of the first DC power source being of approximately equal magnitude and opposite polarity of a source voltage of the second DC power source.

13. A system for providing power to a load, the system comprising:
    a first input to receive AC power from a first AC power source;
    a second input to receive AC power from a second AC power source;
    a third input to receive DC power from a first DC power source;
    an output that provides output AC power to the load;
    converter means for selecting from the first AC power source, the second AC power source and the first DC power as a source for input power and deriving the output AC power from the input power; and
    bypass means for selectively providing AC power from the first AC power source directly to the output, bypassing the converter means;
    wherein the bypass means include means for selectively providing AC power from the second AC power source directly to the output, bypassing the converter means; and wherein the converter means includes means for transitioning a draw of input current by the converter means from the first AC power source at the first input to the first DC power source at the third input, such that during a first transition period, input current is drawn by the converter means alternately from the first AC power source and the first DC power source;
    wherein the converter means includes means for transitioning a draw of input current by the converter means from the first DC power source at the third input to the second AC power source at the second input, such that during a second transition period, input current is drawn by the converter means alternately from the first DC power source and the second AC power source;
    further comprising a fourth input to receive DC power from a second DC power source, and wherein the converter means includes means for transitioning a draw of input current by the converter means from the first AC power source at the first input to the second DC power source at the fourth input, such that during the first transition period, input current is drawn by the converter means alternately from the first AC power source and the second DC power source.

14. The system of claim 13, wherein the converter means includes means for transitioning a draw of input current by the converter means from the second DC power source at the fourth input to the second AC power source at the second input, such that during the second transition period, input current is drawn by the converter means alternately from the second DC power source and the second AC power source.

15. The system of claim 14, wherein the converter means includes regulator means for producing a first regulated DC voltage, and a second regulated DC voltage.

16. The system of claim 15, wherein the first regulated DC voltage has approximately the same magnitude and opposite polarity of the second regulated DC voltage.

17. The system of claim 16, further comprising means for converting the first regulated DC voltage and the second regulated DC voltage to an AC voltage to provide output AC power.

18. The system of claim 17, further comprising the first DC power source and the second DC power source with a source voltage of the first DC power source being of approximately equal magnitude and opposite polarity of a source voltage of the second DC power source.

19. A system for providing power to a load, the system comprising:
    a first input to receive AC power from a first AC power source;
    a second input to receive AC power from a second AC power source;
    a third input to receive DC power from a first DC power source;
    an output that provides output AC power to the load; and
    converter means, coupled to the first, second and third inputs, for providing output power derived from at least one of the first AC power source, the second AC power source and the first DC power source;
    wherein the converter means includes means for transitioning a draw of input current by the converter means from the first AC power source at the first input to the first DC power source at the third input, such that during a first transition period, input current is drawn by the converter means alternately from the first AC power source and the first DC power source;
    wherein the converter means includes means for transitioning a draw of input current by the converter means from the first DC power source at the third input to the second AC power source at the second input, such that during a second transition period, input current is drawn by the converter means alternately from the first DC power source and the second AC power source;
    further comprising a fourth input to receive DC power from a second DC power source, and wherein the converter means includes means for transitioning a draw of input current by the converter means from the first AC power source at the first input to the second DC power source at the fourth input, such that during the first transition period, input current is drawn by the converter means alternately from the first AC power source and the second DC power source.

20. The system of claim 19, wherein the converter means includes means for transitioning a draw of input current by the converter means from the second DC power source at the fourth input to the second AC power source at the second input, such that during the second transition period, input current is drawn by the converter means alternately from the second DC power source and the second AC power source.

21. The system of claim 20, wherein the converter means includes regulator means for producing a first regulated DC voltage, and a second regulated DC voltage.

22. The system of claim 21, wherein the first regulated DC voltage has approximately the same magnitude and opposite polarity of the second regulated DC voltage.

23. The system of claim 22, further comprising means for converting the first regulated DC voltage and the second regulated DC voltage to an AC voltage to provide output AC power.

24. The system of claim 19, further comprising the first DC power source and the second DC power source with a source voltage of the first DC power source being of approximately equal magnitude and opposite polarity of a source voltage of the second DC power source.

25. A method of providing power to a load using an uninterruptible power supply (UPS) having a first input that can be selectively coupled to a first AC source, a second AC source, and a first DC source;
the method comprising;
coupling the first input of the UPS to the first AC source and providing output power to a load based on AC power from the first AC source;
detecting a loss of the first AC source;
coupling the first input of the UPS to the first DC source and providing output power from the UPS based on DC power from the first DC source; and
transitioning a draw of input current at the first input from the first DC source to the second AC source by alternately coupling the first DC source and the second AC source to the first input of the UPS;
detecting return of the first AC Source;
transitioning a draw of input current at the first input from the second AC source to the first DC source by alternately coupling the second AC source and the first DC source to the first input of the UPS; and
transitioning a draw of input current at the first input from the first DC source to the first AC source by alternately coupling the first DC source and the first AC source to the first input of the UPS;
wherein the UPS has a second input that can be selectively coupled to the first AC source, the second AC source, and a second DC source, the method further comprising:
coupling the second input of the UPS to the first AC source and providing output power to a load based on AC power from the first AC source;
after detecting the loss of the first AC source, coupling the second input of the UPS to the second DC source and providing output power from the UPS based on DC power from the second DC source; and
transitioning a draw of input current at the second input from the second DC source to the second AC source by alternately coupling the second DC source and the second AC source to the second input of the UPS.

26. The method of claim 25, further comprising:
detecting the return of the first AC Source;
transitioning a draw of input current at the second input from the second AC source to the second DC source by alternately coupling the second AC source and the second DC source to the second input of the UPS; and
transitioning a draw of input current at the second input from the second DC source to the first AC source by alternately coupling the second DC source and the first AC source to the second input of the UPS.

* * * * *